Aug. 19, 1969   A. S. IVESTER   3,461,785

EXPOSURE CONTROL APPARATUS

Filed March 13, 1967

INVENTOR
Andrew S. Ivester

Brown and Mikulka
and
James L. Neal
BY   ATTORNEYS

United States Patent Office 3,461,785
Patented Aug. 19, 1969

3,461,785
EXPOSURE CONTROL APPARATUS
Andrew S. Ivester, Morganton, N.C., assignor to Polaroid Corporation, Cambridge, Mass., a corporation of Delaware
Filed Mar. 13, 1967, Ser. No. 622,597
Int. Cl. G03b 9/64
U.S. Cl. 95—53.3                    7 Claims

ABSTRACT OF THE DISCLOSURE

Photographic exposure control apparatus includes a shutter blade driven by an elongated spring from its reset to its rundown position for producing a photographic exposure. A reset lever is engageable with the drive spring for returning the shutter blade to its reset position abutting an electromagnet, subsequent to each exposure. Continued movement of the reset lever after abutment causes a reverse bias in the drive spring. The resulting flexure in the spring causes the shutter blade to be pressed firmly against the electromagnet. The shutter blade is retained against the electromagnet so that it may be magnetically engaged and retained thereby during an exposure interval. Thereafter it is released for movement to its rundown position.

BRIEF SUMMARY OF THE INVENTION

This invention contemplates use of an exposure control device including shutter blade means adapted for exposure producing movement relative to an exposure aperture and reset apparatus for returning the shutter blade means to its preexposure position, subsequent to each exposure. The shutter means includes a shutter blade and an elongated spring member connected to the blade for imparting exposure influencing movement thereto. After each exposure, the reset apparatus is operated to engage the elongated spring member and advance it, against its bias, toward its preexposure position, to thereby advance the shutter blade to the position it occupied prior to the aforesaid exposure influencing movement. Advancement of the shutter blade is blocked when it is returned to its preexposure position, thus further movement of the reset apparatus occasions or reverses bias of the elongated spring member. A latch is provided for engaging the spring member after operation of the reset apparatus to retain it in the reverse-biased condition and retain the shutter blade in its preexposure position.

A number of advantages accrue from direct engagement between the spring member and the reset apparatus.

One advantage is the resulting uncomplicated construction for the exposure control apparatus. The construction is reliable, inexpensive and characterized by a need for only one connecting or bearing member upon the shutter blades. Multiple connecting or bearing members, which might otherwise be mounted upon the shutter blade would increase its mass and thus undesirably increase inertial delay of the blade upon release thereof for exposure influencing movement.

Another advantage, present in applications wherein movement of the shutter blade is blocked when it reaches reset position, is that flexure characteristics of the spring member allow overtravel of the reset apparatus and thereby substantially eliminates the possibility of damage to the apparatus during reset operation.

A further advantage may be obtained in applications utilizing a two bladed shutter, the operation of which is controlled by an electrical trigger circuit including an electromechanical holding means. In a preferred embodiment, a first shutter blade is releasably retained in blocking position relative to the aperture by a mechanical latch engaging the elongated spring member which would otherwise urge the first blade to its unblocking position. A second shutter blade is releasably held in aperture unblocking position by releasable magnetic holding means and is biased by another spring for movement toward aperture blocking position. Upon release of the first blade, it is moved to aperture unblocking position. Substantially simultaneously with release of the first blade, timing operation of the circuit is initiated and the electromechanical holding means is energized. The holding means is mounted against the unblocking position of the second blade for holding the second blade in aperture unblocking position until the timing operation is complete; it then releases the second blade for aperture blocking movement. The reset apparatus is engageable with the spring member for returning the first blade to aperture blocking position subsequent to exposure. The first and second shutter blades are so arranged that the aforesaid return of the first blade is effective to return the second blade to its unblocking position against the electromechanical holding means. Movement of the second blade against the holding means occurs simultaneously with return of the first blade to its aperture blocking position and acts to prevent further movement of the shutter blades. Flexure characteristics of the elongated spring permit overtravel of the reset apparatus; overtravelling movement of the reset apparatus flexes the spring member and reverses its bias so that it presses the second shutter blade firmly against the holding means. Firm engagement of the holding means by the second blade eliminates the otherwise possible existence of a gap between the second blade and the holding means, to thereby facilitate establishment of a holding force upon the second blade by the holding means when the holding means is energized. Latch means is provided for releasably holding the shutter blades in the aforesaid reset positions.

A primary object of this invention is to provide an uncomplicated, reliable, and inexpensive photographic exposure control apparatus.

It is also an object to provide exposure control apparatus including a shutter blade reset mechanism wherein the possibility of damage resulting from overtravel of the reset mechanism is substantially eliminated.

It is another object to provide exposure control apparatus having a shutter blade driven by an elongated spring member and a mechanism engageable with the spring member for resetting the shutter blade subsequent to each exposure.

A further object of this invention is to provide photographic shutter including magnetic holding means for releasably holding a shutter blade against movement, and reset apparatus for returning the released shutter blade to position for firm reengagement by the magnetic holding means.

Other objects of the invention will in part be obvious and will in part appear hereinafter.

BRIEF DESCRIPTION OF THE DRAWINGS

The invention accordingly comprises the apparatus possessing the construction, combination of elements and arrangement of parts which are exemplified in the following detailed disclosure of a preferred embodiment taken in connection with the accompanying drawings wherein.

DETAILED DESCRIPTION OF THE DRAWING

Figure 1:
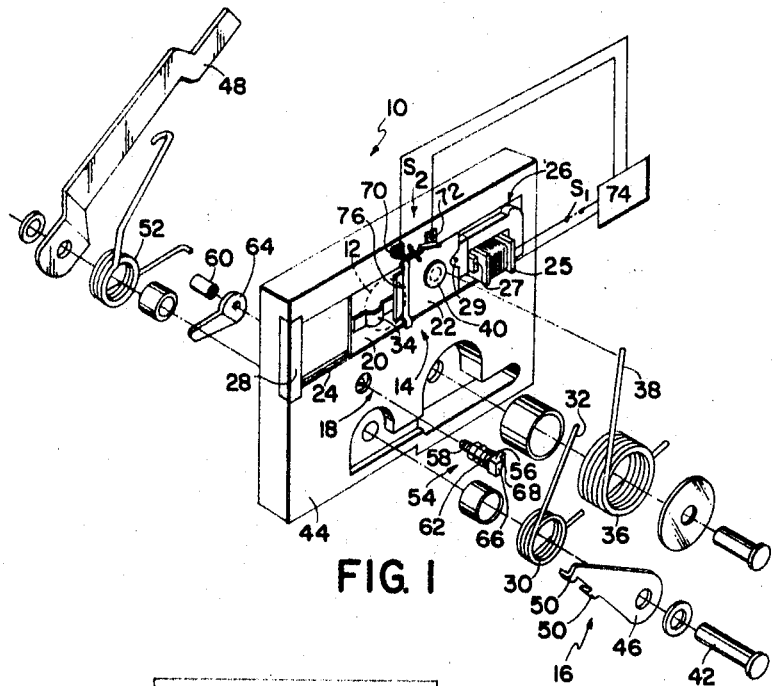
FIGURE 1 illustrates, in partially exploded perspective, one embodiment of the photographic exposure control apparatus of the present invention.

Referring now to FIGURE 1, exposure control apparatus 10 is shown as including exposure aperture 12, shutter means 14, reset mechanism 16, latch mechanism 18, and switch S2.

Shutter means 14 may include first shutter blade means 20 and second shutter blade means 22 mounted in juxtaposition with each other for movement along track 24 between initial and terminal positions. Electromechanical holding means 26, including solenoid 25 and core 27, is mounted against one end of track 24 to prevent movement of the blades beyond their initial positions. Stop 28 is mounted at the other end of the track to prevent movement of the blades beyond their terminal positions. When the blades are in their initial positions, keeper 29, mounted upon shutter blade means 22, abuts core 27 of electromechanical holding means 26 and shutter blade 20 abuts blade 22, thereby positioning blade means 22 in unblocking relationship with aperture 12 and blade means 20 in blocking relationship therewith. In their terminal positions, blade 20 abuts stop 28, in unblocking relationship with aperture 12, and blade 22 abuts blade 20, in blocking relationship with aperture 12. Blade 20 is biased toward its terminal position by spring drive means 30 which includes an elongated portion 32 operatively connected to blade 20 by strap 34. Blade 22 is biased toward its terminal position by spring means 36 which includes elongated portion 38 bearing on fixed pin 40 extending from blade 22.

Reset apparatus 16 serves to advance shutter blades 20 and 22 from their terminal positions to their initial positions subsequent to exposure producing movement thereof. The reset apparatus may include rotatable shaft 42 extending through support 44, reset lever 46 mounted on one end of the shaft for movement along a path complementary to that of elongated spring portion 32, and reset actuator arm 48 mounted upon the opposite end of shaft 42. Reset lever 46 includes projections 50 extending into the path of movement of elongated spring portion 32 for selectively engaging portion 32 and imparting movement thereto against the bias of spring means 30. Spring 52 biases reset lever 46 to a reset position out of engaging relationship with elongated portion 32.

Releasable retaining means 18 may include latch pin 54 having head portion 56 and shaft portion 58. Shaft portion 58 extends through support 44 and is reciprocally retained therein by nut 60. Spring 62 surrounds shaft 58, between head portion 56 and support 44, to bias latch pin 54 toward a raised position wherein head portion 56 extends into the path of movement of elongated portion 32 of spring drive means 30. Latch release lever 64 is mounted on shaft 58 between nut 60 and support 44 for selectively moving latch pin 54 against bias of spring 62 to a retracted position out of the path of movement of elongated portion 32. Latch pin 54 includes cam surface 66 and seat 68. Cam surface 66 permits movement of elongated portion 32 of spring 30 past the latch pin 54, when the pin is raised, as the shutter blades are advanced from terminal position to initial position by reset apparatus 16. Sseat 68 releasably engages elongated portion 32 to prevent return movement of the shutter blades to the terminal position.

Switch S2 may include poles 70 and 72 wherein pole 70 is normally biased out of contact with pole 72 and is adapted to be thrown into contact therewith in response to the presence of shutter blade 20 in its initial position. Switch S2 is operative in conjunction with timing circuit means 74 and the solenoid 25 included therein, for controlling exposure interval duration in a manner to be subsequently described.

Prior to initiation of exposure, blades 20 and 22 are positioned as shown in FIGURE 1. Portion 32 of spring 30 is engaged by seat 68 of latch pin 54 and retained against movement. When so retained, portion 32 urges blade means 22 toward electromechanical holding means 26 and maintains keeper 29 in tight contact with case 27 in a manner to be subsequently described.

To initiate exposure, release lever 64 is depressed to retract latch pin 54 against bias spring 62 and to substantially and simultaneously close switch S1. Retraction of latch pin 54 releases portion 32 of spring 30 so that spring 30 drives shutter blade 20 towards its terminal position for unblocking aperture 12 and initiating exposure. Movement of blade 20 is halted in the terminal unblocking position thereof by stop means 28. Closure of switch S1 energizes timing circuit 74 and solenoid 25 of electromechanical holding means 26 to prevent movement of blade 22, which would otherwise occur in response to the bias of spring 36 upon movement of blade 20. Energization of solenoid 25 provides in the magnetic circuit of core 27 and keeper 29 a magnetic induction sufficiently large to create a force on the keeper for holding blade 22 in its initial position against the bias of spring 38 independently of movement of blade 20. In response to initial aperture unblocking movement of blade 20, pole 70 of switch S2 breaks contact with pole 72 to initiate timing operation of timing circuit 74. The timing operation is completed a predetermined time interval after initiation thereof. Completion of the timing operation deenergizes solenoid 25 whereby spring 36, acting on pin 40, advances blade 22 toward and to its terminal position for blocking aperture 12 and terminating exposure. At the terminal position, blade 22 abuts opening blade 20 and is biased into continuous contact therewith by spring means 36.

Since human reaction time in depressing and releasing lever 64 substantially exceeds the longest exposure likely to be used under normal "snapshot" conditions, switch S1 will be closed for at least as long as the correct exposure time and will be released only after both blades 20 and 22 have reached their terminal positions. Upon release of lever 64 spring 62 expands to return latch pin 54 to its raised position for extension into the path of portion 32 of spring 30.

Figure 2A:
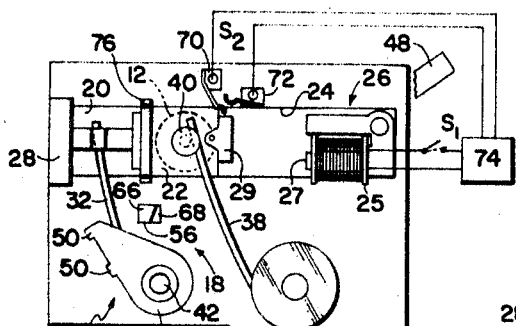
FIG. 2a is a plan view of the apparatus of FIGURE 1 subsequent to exposure producing operation thereof.

After termination of exposure, the shutter blades are as shown in FIG. 2a and latch pin 54 is positioned for the aforesaid engagement with portion 32 of spring drive means 30.

Figure 2C:
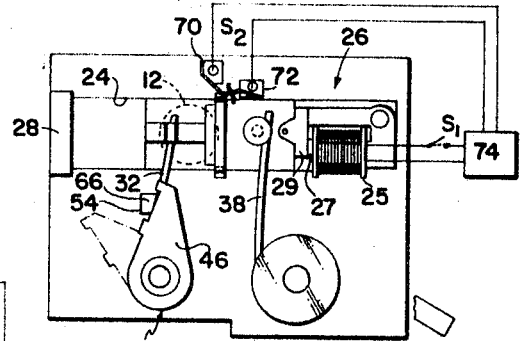
FIG. 2c is a plan view of the apparatus of FIGURE 1 subsequent to the reset operation.
Figure 2B:
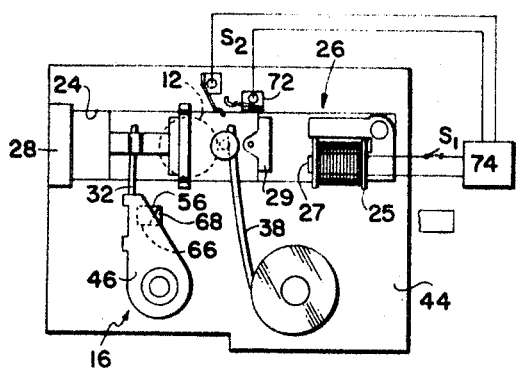
FIG. 2b is a plan view of the apparatus of FIGURE 1 showing the position obtained by elements thereof during the reset operation.

Shutter blades 20 and 22 must be reset to their initial positions for a subsequent exposure. Actuator arm 48 is operated, against the bias of spring 52, to rotate shaft 42 and reset lever 46. Upon rotation of the reset lever, projections 50 engage portion 32 of spring 30 and advance it, against its bias, to advance blades 20 and 22 along track 24 from their terminal positions toward their initial positions. One intermediate position is shown in FIG. 2b. In the position of FIG. 2b, the zone of shutter blade means 14 which includes abutting surfaces of shutter blades 20 and 22 is positioned over exposure aperture 12. It will be observed that light seal means 76, mounted upon blade means 20, covers the aforesaid zone to prevent light leakage along this zone which might otherwise occur as the zone passes aperture 12 during the reset operation.

Advancement of spring portion 32 eventually causes it to strike and ride upon cam surface 66 of latch pin 54, at least partially depressing the latch pin against the action of spring 62. Shutter blades 20 and 22, releasable retaining means 18, and electromechanical holding means 26 are so arranged that keeper 29 strikes core 27 to block further movement of the shutter blades when they reach their respective initial positons, simultaneously with the aforesaid striking action of spring portion 32 upon cam surface 66. Overtravel of reset lever 46, subsequent to blocking of shutter blade movement, is permitted due to the flexibility of elongated portion 32 of spring 30. Overtravel of the reset lever flexes portion 32 to press blade 20 tightly against blade 22 and, overcoming the bias of spring means 36, blade 20 acts to press keeper 29 on blade 22 tightly against solenoid 25, thereby maintaining keeper 29 in constant, close contact with core 27. The close contact between keeper 29 and core 27 eliminates the possibility of a gap developing between the keeper and the core and thereby facilitates production of a positive holding force on blade 22 when solenoid 25 of electromechanical holding means 26 is energized. The flexing action of portion 32 also provides a resilient connection between the reset lever and shutter blades so that chances of damage to the apparatus during reset operation is substantially eliminated.

The overtravel producing movement of reset lever 46 advances portion 32 of spring 30 past cam surface 66 of latch pin 54, onto seat 68. The latch pin then returns to raised position, in response to the biasing action of spring 62, so that seat 68 engages portion 32 and maintains it in its flexed condition. Shutter blade means 14, latch mechanism 18, and reset mechanism 16 are now as shown in FIG. 2c. Release of actuator arm 40 permits return of reset lever 46 to its rest position, shown in broken lines of FIG. 2c. Upon return of the reset lever, the exposure control mechanism is reset to the position shown in FIGURE 1 and is ready for the production of another exposure upon actuation of latch release lever 64.

It will be seen from the foregoing description that the described embodiment of the invention accomplishes the above-mentioned objects by providing an uncomplicated, reliable, and inexpensive photographic exposure control apparatus having a reset mechanism which substantially eliminates the possibility of mechanical damage to the apparatus during reset operation and which properly returns the shutter means to position for exposure production subsequent to each exposure.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Exposure control apparatus for a photographic camera comprising:
   (a) shutter blade means movable between initial and terminal positions to influence exposure along an optical axis;
   (b) spring means connected to said blade means for moving said blade means from said initial position to said terminal position;
   (c) means blocking movement of said blade means upon return thereof to said initial position; and
   (d) reset means engageable with said spring means for returning said shutter blade means to said initial position wherein further movement of said blade means is blocked by said blocking means, said reset means operating to advance said spring means subsequent to the blocking of movement of said shutter blade means for causing said spring means to press said shutter blade means firmly against said blocking means.

2. Exposure control apparatus according to claim 1 further comprising latch means enageable with said spring means for retaining said shutter blade means in said initial position and to maintain said shutter blade means pressed against said blocking means.

3. Exposure control apparatus for a photographic camera comprising:
   (a) shutter blade means movable in a forward direction from an initial position to a terminal position to influence exposure through a photographic aperture;
   (b) an elongated spring connected at one end to said blade means and stressed to urge said blade means forward from its initial position to its terminal position;
   (c) reset means engageable with an intermediate portion of said spring to move said blade means in a reverse direction toward its initial position;
   (d) means blocking further movement of said blade means in said reverse direction after said blade means returns to its initial position, whereby further movement of said reset means occasions a reverse flexure of said one end of said spring means to urge said blade means in said reverse direction; and
   (e) releasable latch means engageable with said spring means when reverse flexed to retain said blade means in said initial position until said latch means is released.

4. Exposure control apparatus for a photographic camera having an exposure aperture comprising:
   (a) first shutter blade means movable between initial and terminal positions for influencing exposure through said aperture;
   (b) spring means connected to said first shutter blade means for moving said first blade means from its initial position to its terminal position;
   (c) second shutter blade means movable between initial and terminal positions for further influencing exposure through said aperture;
   (d) means for moving said second blade means from its initial position to its terminal position;
   (e) reset means acting upon said spring means when said first blade means is in its terminal position for advancing said first blade means toward and to its initial position;
   (f) means for advancing said second blade means toward and to its initial position in response to advancement of said first blade means toward and to said initial position thereof;
   (g) means for blocking movement of said second blade means upon return thereof to its initial position; and
   (h) means for blocking movement of said first blade means in its initial position when movement of said second blade means is blocked wherein said reset means operates to advance said spring means subsequent to the blocking of movement of said first and second shutter blade means for causing said spring means to urge said first and second blade means toward their respective blocking means.

5. Exposure control apparatus according to claim 4 further comprising latch means engageable with said spring means when said reset means is in said condition of overtravel to thereby maintain said first and second shutter blade means in their respective initial positions.

6. Exposure control apparatus for a photographic camera having an exposure aperture comprising:
   (a) first shutter blade means movable between an initial and a terminal position for unblocking said aperture;
   (b) spring means connected to said first blade means for moving said first blade means from its initial position to its terminal position;
   (c) second shutter blade means movable between an initial and a terminal position for blocking said aperture;
   (d) means for moving said second blade means from its initial position to its terminal position;
   (e) releasable magnetic holding means mounted adjacent the initial position of said second blade means, and preventing further movement of said second blade means upon return thereof to said initial position;
   (f) reset means engaging said spring means when said first blade means is in its terminal position for advancing said first blade means toward and to its initial position; said first blade means engaging said second blade means for advancing said second blade means to its initial position against said magnetic holding means in response to advancement of said first blade means to its initial position;

(g) whereby after said first and second shutter blade means have reached their respective initial positions reverse flexure of said spring means allows overtravel of said reset means thereby pressing said first shutter blade means into firm contact with said second shutter blade means and said second blade means into firm contact with said magnetic holding means.

7. Exposure control apparatus according to claim 6 further comprising means releasably engaging said spring means when said reset means is in its condition of overtravel for releasably maintaining said first blade means in its initial position, in pressing contact with said second blade means, and for releasably maintaining said second blade means in its initial position, in pressing contact with said magnetic holding means.

References Cited
UNITED STATES PATENTS

| | | | |
|---|---|---|---|
| 609,033 | 8/1898 | Locke | 95—60 |
| 2,267,794 | 12/1941 | Kosken | 95—55 |
| 3,191,511 | 6/1965 | Burgarella | 95—60 XR |
| 3,249,034 | 5/1966 | Burgarella | 95—53 |

NORTON ANSHER, Primary Examiner

LEO H. McCORMICK, JR., Assistant Examiner

U.S. Cl. X.R.

95—53, 55